United States Patent

Minegishi et al.

[11] Patent Number: 5,867,902
[45] Date of Patent: Feb. 9, 1999

[54] METHODS OF FABRICATING INNER ROLLER AND OUTER ROLLER IN INTERNAL-MESHING PLANETARY GEAR CONSTRUCTION

[75] Inventors: Kiyoji Minegishi, Aichi; Masanori Egawa, Chiryu; Hiroki Yamazaki, Ohbu, all of Japan

[73] Assignee: Sumitomo Heavy Industries Ltd., Tokyo, Japan

[21] Appl. No.: 872,388

[22] Filed: Jun. 10, 1997

[30] Foreign Application Priority Data

Jun. 11, 1996 [JP] Japan .................................. 8-148839

[51] Int. Cl.$^6$ ..................................................... B23P 15/00
[52] U.S. Cl. ..................... 29/895.33; 29/895.31; 29/558
[58] Field of Search .............. 29/895.33, 895.3, 29/895.31, 895, 558

[56] References Cited

U.S. PATENT DOCUMENTS

| | | | |
|---|---|---|---|
| 410,651 | 9/1889 | Schwab | 29/895.33 |
| 3,927,450 | 12/1975 | Sommer et al. | 29/558 |
| 4,658,823 | 4/1987 | Lopez | 29/558 |

*Primary Examiner*—Irene Cuda
*Attorney, Agent, or Firm*—Nikaido, Marmelstein, Murray & Oram LLP

[57] ABSTRACT

In fabricating an inner roller for use in an internal-meshing planetary gear construction, the outer periphery of an inner-roller blank 30c is chucked in the state in which depressive forces are equally exerted on the outer periphery in all the directions thereof by a chucking jig 50A, and the inner-peripheral wall of the blank 30c is subjected to a burnishing work in this state. The resulting inner-roller blank 30c is heat-treated in the state in which the depressive chucking is released, whereupon the outer periphery of the blank 30c is finished by grinding. It is accordingly possible to fabricate at low cost the inner roller which can suppress angular backlash owing to a smaller clearance defined between it and a mating inner pin, and which exhibits a high durability and favorable slip characteristics.

4 Claims, 6 Drawing Sheets

PRIOT ART

PRIOT ART

PRIOT ART

PRIOT ART

METHODS OF FABRICATING INNER ROLLER AND OUTER ROLLER IN INTERNAL-MESHING PLANETARY GEAR CONSTRUCTION

BACKGROUND OF THE INVENTION

1. Field of the Invention

The present invention relates to a method of fabricating an inner roller or an outer roller in an internal-meshing planetary gear construction.

2. Description of the Prior Art

There has heretofore been extensively known an internal-meshing planetary gear construction having a first shaft, eccentric elements which are rotated by the rotation of the first shaft, external gears which are assembled so as to be respectively rotatable eccentrically to the first shaft through the corresponding eccentric elements, an internal gear with which the external gears are "in internal mesh" (that is, with which the external gears mesh internally of this internal gear), and a second shaft which is connected to the external gears through a device for transmitting only the rotational components of the external gears on the axes thereof.

An example of the construction in the prior art is illustrated in FIGS. 3 and 4. The prior-art example is such that the construction is applied to "reduction gears" by employing the first shaft as an input shaft and the second shaft as an output shaft and by fixing the internal gear.

Eccentric elements 3a, 3b are snugly fitted on the input shaft 1 with a predetermined phase difference (180° in this example) set therebetween. The eccentric elements 3a and 3b are integral in this example. Two external gears 5a, 5b are mounted on the respective eccentric elements 3a, 3b through corresponding bearings 4a, 4b. Each of the external gears 5a and 5b is formed with a plurality of inner roller holes 6 (6a and 6b), in each of which an inner pin 7 and an inner roller 8 are inserted.

The inner pin 7 is enclosed or concealed with the inner roller 8 for the purpose of dispersing slips during the operation of the planetary gear construction, that is, the slips between the inner pins 7 and the external gears 5a, 5b are dispersed into the slips between the inner pins 7 and the inner rollers 8, and the slips between the inner rollers 8 and the external gears 5a, 5b.

The inner pins 7 and inner rollers 8 which penetrate through the external gears 5a, 5b are secured or fitted in the flange portion of the output shaft 2.

The 2 (two) external gears 5a, 5b (in a double-row structure) are chiefly intended to enlarge a transmission capacity, to maintain a strength and to hold a dynamic rotational balance.

External teeth 9 of trochoidal tooth profile, circular-arc tooth profile, or the like are provided at the outer periphery of each of the external gears 5a, 5b. The external teeth 9 are in internal mesh with the internal gear 10 fixed to a casing 12.

The internal teeth of the internal gear 10 are concretely constructed of outer pins 11. The outer pins 11 are loosely fitted in outer pin holes 13, and are held easy of rotation. Each of the outer pins 11 is sometimes enclosed with an outer roller 14 as shown in FIG. 5 by way of example. Thus, slips during the operation can be dispersed (that is, the slips between the outer pins 11 and the outer pin holes 13 in FIG. 4 can be dispersed into the slips between the outer pins 11A and the outer rollers 14, and the slips between the outer rollers 14 and the outer pin holes 13 as understood from FIG. 5).

The operation of the exemplified reduction gears will be briefly explained. When the input shaft 1 is rotated one revolution, the eccentric elements 3a, 3b is also rotated one revolution. When the eccentric elements 3a, 3b perform one revolution, the respective external gears 5a, 5b are about to rock (or swing) and rotate around the input shaft 1. Since, however, the rotations of the external gears 5a, 5b on the axes thereof are restrained by the internal gear 10, the external gears 5a, 5b perform almost only the rocking in internal mesh with the internal gear 10.

Now, supposing by way of example a case where the number of teeth of each of the external gears 5a and 5b is N and where the number of teeth of the internal gear 10 is (N+1), the difference between the numbers of teeth is 1 (one). Consequently, each time the input shaft 1 is rotated one revolution, the external gears 5a and 5b shift (or rotate on their own axes) to the amount of one tooth relative to the internal gear 10 fixed to the casing 12. This signifies that speed of one rotation of input shaft 1 is reduced to speed of −1/N rotation of the external gears 5a, 5b. Here, the minus sign indicates the reverse rotation (or the revolution in the reverse direction).

The rotations of the external gears 5a, 5b have the rocking components thereof absorbed by clearances defined between the inner roller holes 6 and the inner rollers 8, and only the rotational components thereof on their own axes are transmitted to the output shaft 2 through the inner pins 7 inserted in the inner rollers 8. As a result, speed reduction at a reduction ratio of −N is eventually accomplished.

By way of example, accordingly, a geared motor of great reduction ratio can be obtained with only one stage of reduction mechanism by combining the reduction gears of the internal-meshing planetary gear construction with an electric motor.

In the prior-art example, the internal gear of the internal-meshing planetary gear construction is fixed, and the first shaft and second shaft are respectively employed as the input shaft and output shaft. However, reduction gears can also be constructed by fixing the second shaft, employing the first shaft as an input shaft and employing the internal gear as an output shaft. Further, speedup gears can also be constructed by inverting the input/output relations of each of such reduction gears.

Besides, in the prior-art example, the eccentric elements are directly mounted on the outer periphery of the first shaft. In this regard, there has also been known a construction of the type wherein the first shaft is dispersed or divided into "three first shafts" through spur gears, eccentric elements are respectively mounted on the dispersed first shafts, and the external gears are rockingly rotated through the eccentric elements. The present invention is applicable even to the internal-meshing planetary gear construction of such a type without any problem.

Meanwhile, as exaggeratedly shown in FIG. 6, a clearance δ1 is defined between the outer periphery of the inner pin 7 and the inner periphery of the inner roller 8. Besides, as exaggeratedly shown in FIG. 7, a clearance δ2 is defined between the outer periphery of the outer pin 11A and the inner periphery of the outer roller 14. Each of the clearances δ1 and δ2 serves to ensure the formation of a lubricating oil film between the two members, and to allow the smooth slip between the members touching with each other.

However, when such a clearance δ1 or δ2 is defined, the problem arises that backlash develops between the inner pin 7 and the inner roller 8 or between the outer pin 11A and the outer roller 14, with the result that the whole gear transmission mechanism undergoes backlash. This incurs the disadvantage that, to when the rotation on one side is to be transferred to the rotation on the other side, the rotation on the driving side does not immediately appear as the rotation on the driven side. Hereinbelow, such a delay in response shall be termed "angular backlash".

In a case where the internal-meshing planetary gear construction is used as the control mechanism of, for example, a servomotor, the angular backlash degrades the control precision thereof. Various causes are considered for the occurrence of the angular backlash in the internal-meshing planetary gear construction. As contrivances for eliminating such angular backlash, there have hitherto been known various structures, for example, one wherein the external gears, the internal gear, etc. are bisected for forward rotation and for reverse rotation, and one wherein the roles of the external gears, the internal gear, etc. are allotted to the forward rotation and to the reverse rotation. In these techniques, for example, the external gears for forward rotation are mounted with no angular backlash against the direction of forward rotation, and used only for forward rotation. On the other hand, the external gears for reverse rotation are also mounted with no angular backlash against the direction of reverse rotation and used only used for reverse rotation.

In addition, the inventors have even proposed an expedient as a method of minimizing a clearance relevant to an outer pin and an outer pin hole (in an internal-meshing planetary gear construction of the type which has no outer roller). In this technique, the outer pin and outer pinhole are contacted with each other only at 3 points, so that two oil pockets therebetween are formed to prevent seizure thereof.

In any of the known examples, however, note has never been taken of the clearance δ1 between the inner pin and the inner roller or the clearance δ2 between the outer pin and the outer roller for the purpose of relieving the angular backlash. It has been the actual circumstances that quite no measure is taken to counter the angular backlash developing in the clearance δ1 or δ2.

The reason therefor is that the clearance δ1 or δ2 has been considered unremovable (as an indispensable constituent) because of the following requisites: ① Predetermined lubricating oil film needs to be always formed between the inner pin and the inner roller or between the outer pin and the outer roller. ② Even at the appearance of the state in which the axes of the inner pin and the inner roller or those of the outer pin and the outer roller have deviated due to a machining error, an assemblage error, or the deformation of the two members during the transmission of power, both the members need to be slipped smoothly.

Incidentally, the use of a material of low friction and good affinity, for example, white metal or fluorocarbon resin is also considered as a method which ensures the favorable slides of the two slide members without defining the clearance. In general, however, a great torque with the torque of the input shaft amplified several times to 100 or more times, acts on the inner roller or outer roller of the internal-meshing planetary gear construction. Therefore, a material of high hardness and high strength must be used from the viewpoint of durability, and the above method cannot be adopted in many cases.

Further, in this regard, the material of high hardness and high strength needs to be wrought at a high precision, so that the inside and outside diameters of the inner roller or the outer roller must be finished by "grinding". Especially in case of finishing the inside diameter by the grinding, a finish roughness is limited (to 2–3 [μm] as an economical value) for the reason that the grinding is, to the last, a work for shearing the crystal grains of the material. This has led to the requisite that the existence of the clearance δ1 or δ2 having a certain magnitude is indispensable for keeping an oil film under the condition of the roughness.

For the reasons thus far explained, the clearance δ1 between the inner pin and the inner roller or the clearance δ2 between the outer pin and the outer roller has hitherto been thought indispensable. Accordingly, the occurrence of the angular backlash ascribable to the clearance has been thought inevitable.

SUMMARY OF THE INVENTION

The present invention has been made in view of the problems of the prior art as stated above, and has for its object to provide a method of fabricating an inner roller or an outer roller in an internal-meshing planetary gear construction in which angular backlash can be rendered much less than in the prior art without posing any new drawback.

The objects are achieved by structures defined in claims 1 and 2, as regards the fabrication of inner roller in the internal-meshing planetary gear construction. Quite similar structures defined in claims 3 and 4 are applied to that of outer roller.

The principles of the present invention is as explained below.

As stated before, in the case of fabricating an inner roller (or an outer roller), a material of high hardness and high strength needs to be wrought at a high precision, so that quite no method of fabrication other than "grinding" has heretofore been considered.

In this regard, however, the inventors took note of the fact that a material of very small friction factor and good affinity to slide, for example, white metal or fluoroplastics (fluorocarbon resin), can keep favorable slide characteristics without degrading a durability, even when a clearance for lubrication is not defined appreciably.

As also stated before, such a material cannot be employed for the inner roller or outer roller of an internal-meshing planetary gear construction intended by the present invention, in points of hardness and strength.

The inventors therefore repeated experiments in search of a method which can realize a similar structure by the use of a material of high hardness and high strength, for example, bearing steel.

In due course, a burnishing work was noticed as to the feature of attaining an inner-peripheral wall which has a small friction factor (in other words, which can be turned into a mirror-finished surface) and which exhibits a good affinity to slide.

The "burnishing work" is a working method in which a metal surface having ruggedness is press-rolled (or crushed) by a burnishing roller so as to be finished into a smooth surface like a mirror, and which is known in itself. The burnishing work is a kind of plastic deformation work, and it differs from a work such as cutting in which the crystal grains of metal are shaved off by shearing. It is therefore possible to obtain the inner-peripheral wall which is very smooth in point of surface roughness.

As is well known, however, the burnishing work is a centerless one. In general, it is thought unsuitable for a true-circle work because of residual strains ascribable to depressive forces which act in chucking a blank or workpiece from outside. In actuality, there has hitherto been quite no example in which the inner-peripheral wall of the inner roller or outer roller of the internal-meshing planetary gear construction is formed by the burnishing work.

The inventors have therefore added another contrivance. More specifically, in fixing the blank from outside by chuck means (e.g., a chucking jig), the blank is chucked so that the depressive forces may develop equally radially inward of this blank "in all directions", and the burnishing work is executed in such a state.

This expedient makes it possible to obtain the inner roller (or outer roller) having the inner-peripheral wall which is substantially close to the true circle and which has the mirror-finished surface.

The inner roller (or outer roller) thus fabricated has the inner-peripheral wall the friction factor of which is very small. Therefore, it can favorably form a film of lubricating oil even with a narrowed clearance δ1 (or δ2) and poses quite no problem on the durability. Moreover, regarding the slip characteristics of the inner roller (or outer roller), it has been verified that better results rather than in the prior art are produced (in spite of the narrowed clearance δ1 or δ2).

Above all, as compared with the fabrication based on the "grinding" in the prior art, the method according to the present invention can drastically shorten the working period of time and can curtail the cost of a working machine.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENTS

Now, the aspects of performance of the present invention will be described in detail with reference to the drawings.

The present invention is pertinent only to a method of fabricating an inner roller or outer roller for use in an internal-meshing planetary gear construction, and the structure of the internal-meshing planetary gear construction itself is not especially different from the prior-art structure. Accordingly, the structure of the internal-meshing planetary gear construction itself shall be omitted from description because it has already been detailed.

Here in the aspects of performance, for the sake of convenience, a method of fabricating an inner roller will be explained as an example. It is also possible, however, to fabricate an outer roller by a quite similar method.

FIGS. 1A–1D schematically illustrate fabricating steps. Incidentally, the contraction scales of these figures are not the same because preference is taken of clear illustration.

Figure 1A:
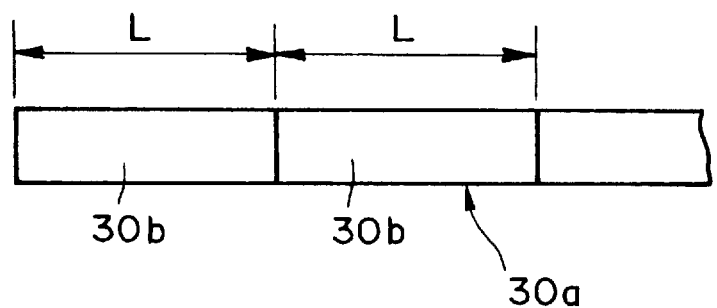
FIGS. 1A thru 1D are flow diagrams for explaining the aspect of performance of a method of fabricating an inner roller according to the present invention.

First, as shown in FIG. 1A, an inner-roller blank 30a being elongate is severed at predetermined lengths L into inner-roller blanks 30b.

Figure 1B:
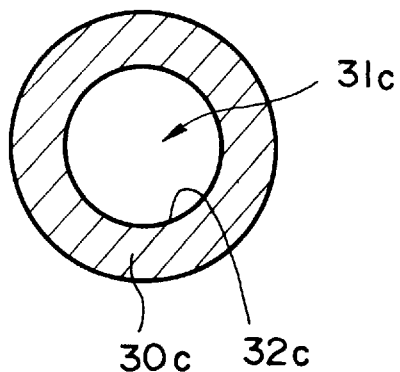

Subsequently, as shown in FIG. 1B, the central part of the inner-roller blank 30b is cut away by any suitable method, for example, boring, reaming or turning. Then, an inner-roller blank 30c in the shape of a cylinder is roughly formed.

The above steps explained are similar to the steps in the prior art. In the prior art, a finishing process for the inner-peripheral wall 32c of the inner-roller blank 30c is thereafter initiated to lathe with a turning. In contrast, according to the present invention, the finishing process is not performed, but the inner-peripheral wall 32c is subsequently made a mirror-finished surface by a burnishing work.

As stated before, the "burnishing work" is a working method in which a metal surface having ruggedness is press-rolled (or crushed) by a burnishing roller so as to be finished into a smooth surface like a mirror, and which is known in itself. The burnishing work is a kind of plastic deformation work, and it differs from a work such as cutting in which the crystal grains of metal are shaved off by shearing. It is therefore possible to obtain the inner-peripheral wall which is very smooth in point of surface roughness.

In executing the burnishing work, the inner-roller blank 30c is fixed by some expedient, and the burnishing roller not shown is inserted into the through hole 31c of the blank 30c.

In this aspect of performance, the fixation of the inner-roller blank 30c is effected in "all the directions" of the outer periphery of the blank 30c as explained below.

Figure 2A:
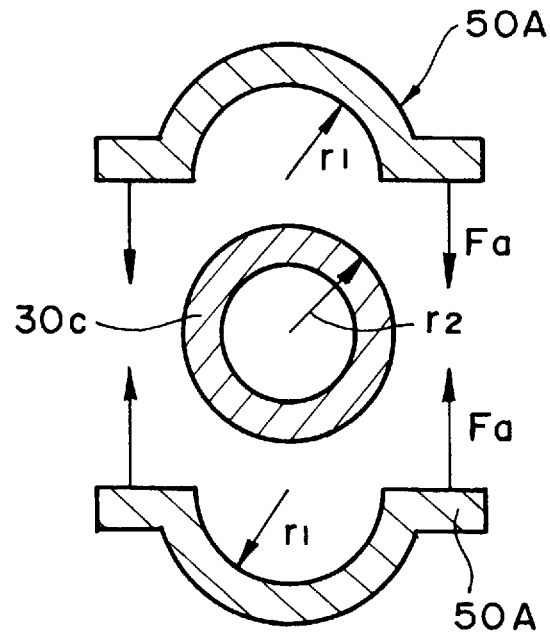
FIGS. 2A and 2B are sectional views each showing an example of depressive chucking with a chucking jig.
Figure 2B:
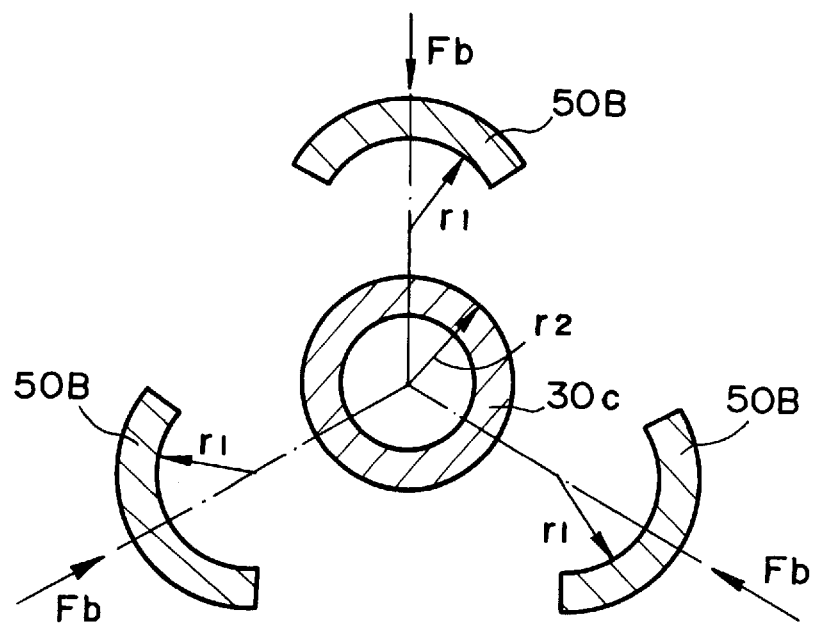
Figure 3:
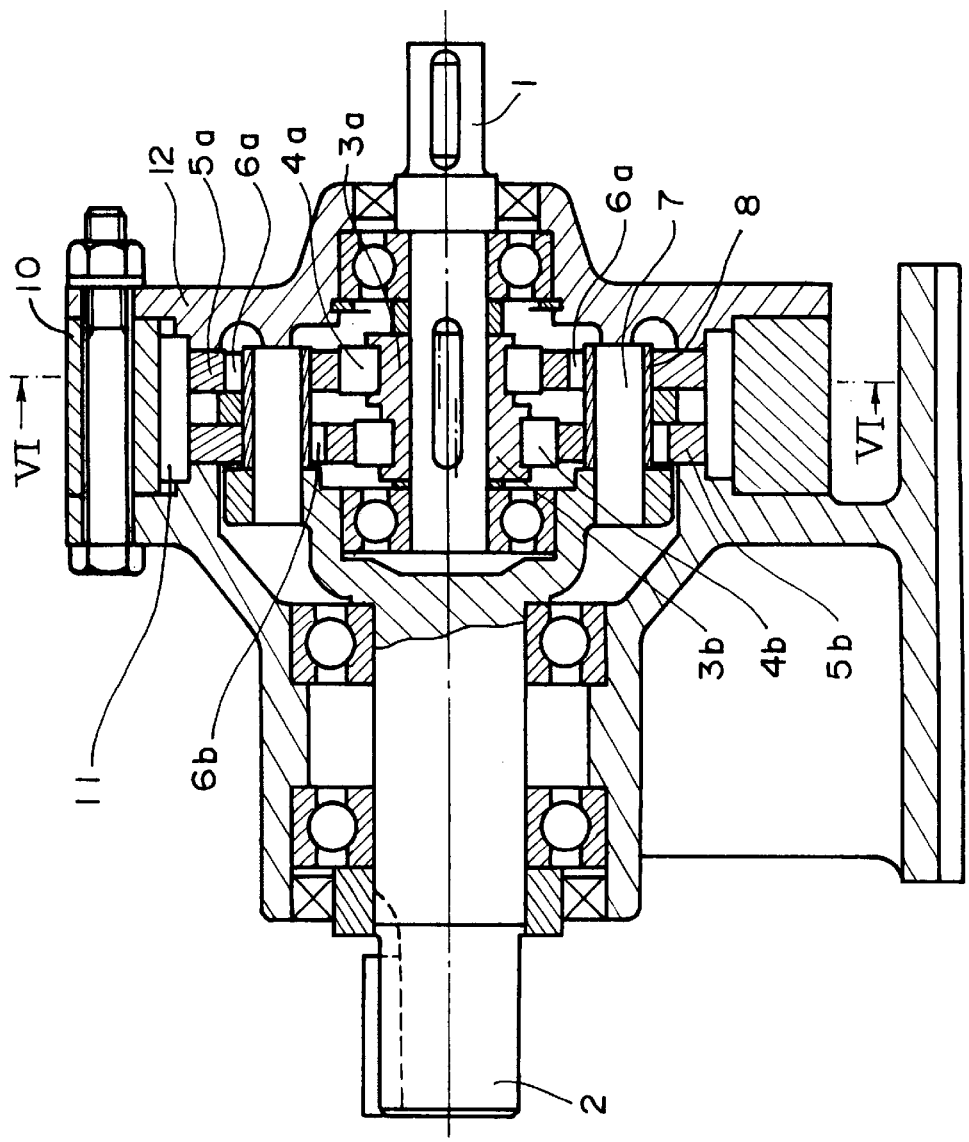
FIG. 3 is a front view, partially broken away, for explaining the structure of an internal-meshing planetary gear construction in the prior art.
Figure 4:
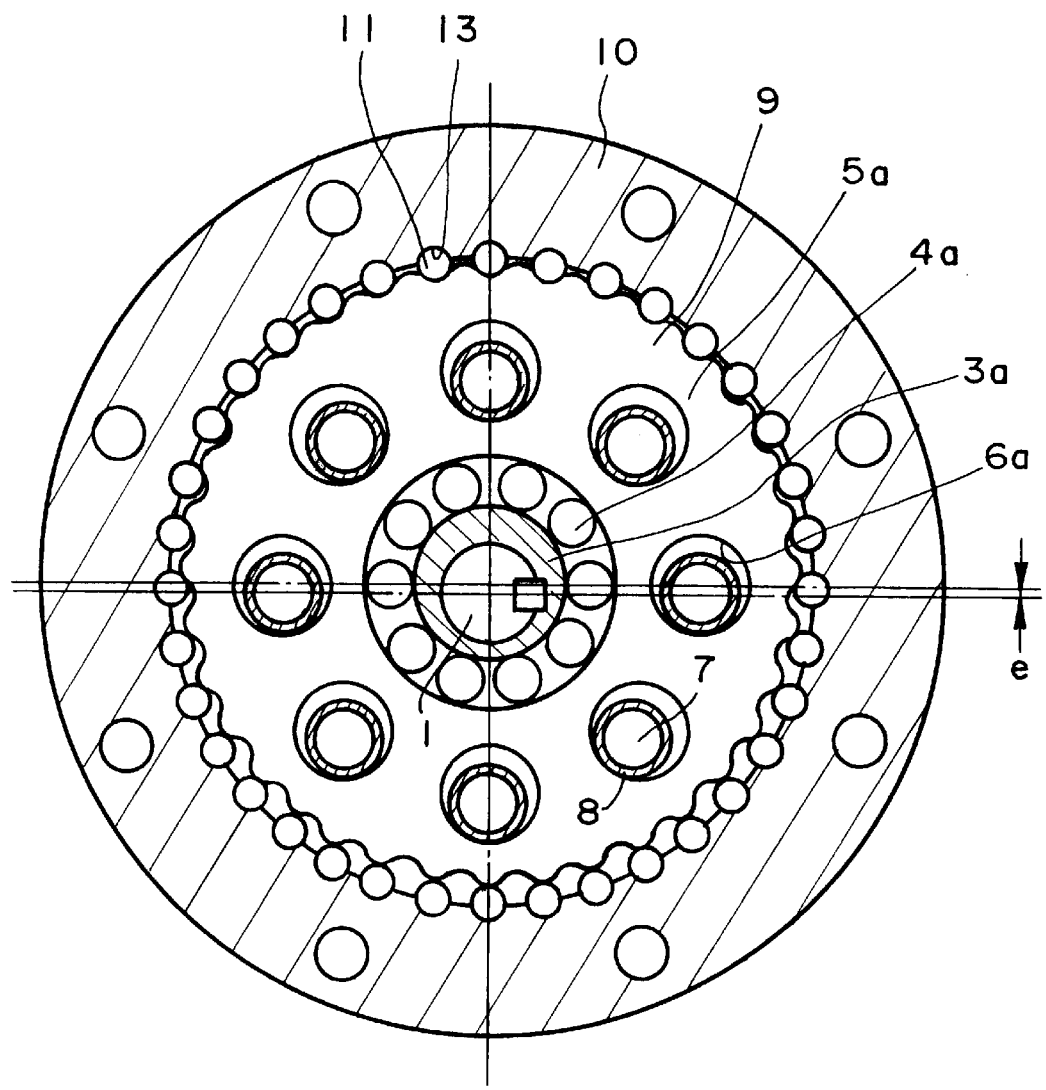
FIG. 4 is a sectional view taken along line IV—IV in FIG. 3.
Figure 5:
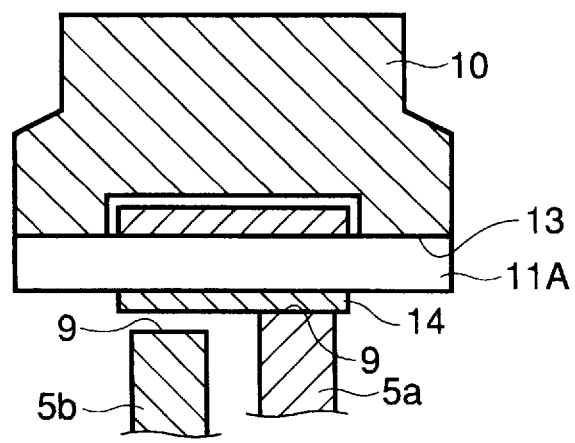
FIG. 5 is an enlarged sectional view of essential portions for explaining the structure of an internal-meshing planetary gear construction which has an outer roller.
Figure 6:
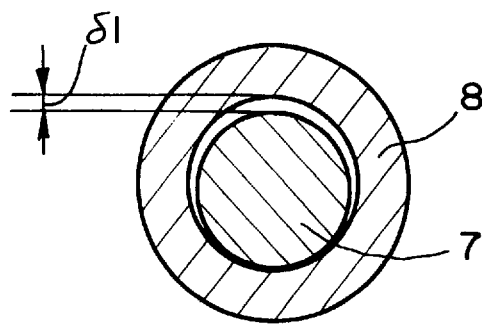
FIG. 6 is an enlarged sectional view for explaining the relationship between an inner roller and an inner pin in the prior art.
Figure 7:
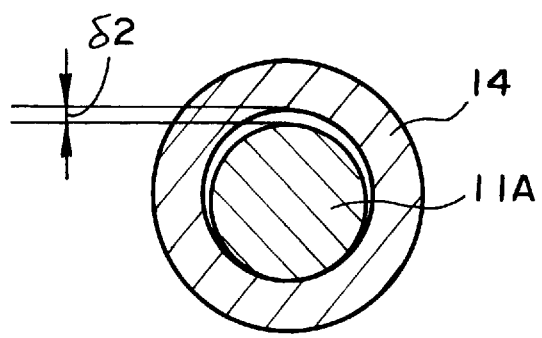
FIG. 7 is an enlarged sectional view for explaining the relationship between the outer roller and an outer pin in the prior art.

More specifically, as shown in FIG. 2A or FIG. 2B, the inner periphery of a chucking jig 50 (50A or 50B) according to this aspect of performance is formed in the shape of a true circle corresponding to the outer periphery of the inner-roller blank 30c. In addition, the radius r1 of the inner periphery of the chucking jig 50 is set so as to become smaller than that r2 of the outer periphery of the inner-roller blank 30c when the blank 30c is chucked by the jig 50.

The chucking jig 50A in the aspect of performance shown in FIG. 2A can be bisected in the vertical direction as viewed in the figure, and it is adapted to depressively chuck the inner-roller blank 30c with depressive forces Fa upward and downward. On the other hand, the chucking jig 50B shown in FIG. 2B can be trisected at angular intervals of 120°, and it is adapted to depressively chuck the inner-roller blank 30c with depressive forces Fb in the three angular directions.

Anyway, the chucking jig 50A or 50B is so designed that the radius r1 of the inner periphery thereof becomes smaller than the radius r2 of the outer periphery of the inner-roller blank 30c on the occasion of the chucking. Moreover, this chucking jig 50A or 50B is designed in such a relationship that the rigidity of the inner periphery thereof becomes lower than the rigidity of the outer periphery of the inner-roller blank 30c.

Figure 1C:
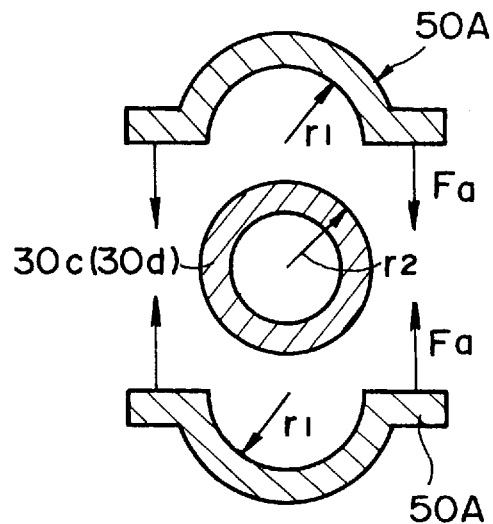

Referring back to the flow diagrams, when the inner-roller blank 30c is chucked by the chucking jig 50 of the above structure (the jig 50A in the illustrated example) as shown in FIG. 1C, the chucking in the state in which the depressive forces are exerted equally in all the directions of the outer periphery of the inner-roller blank 30c is established while almost only the chucking jig 50A is undergoing compressive deformation radially outward on the basis of the relationship of the rigidities of the jig 50A and the blank 30c.

It is accordingly possible to realize the "all-directional depressive chucking" of the inner-roller blank 30c and to obtain an inner-roller blank 30d having an inner-peripheral wall 32d of true circle and mirror-finished surface, by properly managing the axes of the chucking jig 50A or 50B and a burnishing roller not shown, or by contriving a work holder in which the relative positioning between the inner-roller blank 30c and the burnishing roller is settled by this chucking of the chucking jig 50.

In this aspect of performance, the inner-roller blank 30d is subsequently heat-treated. In a case where the inner roller 30 is fabricated of bearing steel by way of example, the heat treatment may be a known expedient in which quenching is followed by tempering. Owing to the all-directional chucking, almost no stress of specified direction remains in the inner-roller blank 30d subjected to the burnishing work. Accordingly, the true circle of the inner-peripheral wall 32d is not spoilt even by the heat treatment.

Figure 1D:
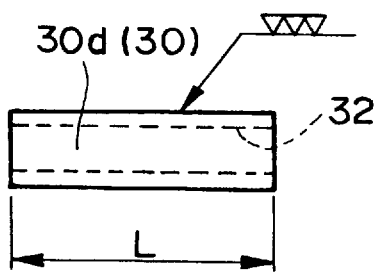

Lastly, as shown in FIG. 1D, the outer periphery of the inner-roller blank 32d is subjected to a finishing work by grinding, similarly to the prior-art method. Then, the inner roller 30 is completed. Owing to the adoption of the fabricating method thus far explained, the inner-peripheral wall 32 of the inner roller 30 is made the mirror-finished surface by the burnishing work, so that the friction factor of the inner-peripheral wall 32 becomes small enough to expect the smooth slip of the inner roller 30 with respect to the mating inner pin. Moreover, the surface of the inner-peripheral wall 32 is made high in hardness and high in strength by the heat treatment, so that the durability of the inner roller 30 is enhanced.

Incidentally, even if the inner-roller is fabricated so as to have an inner-peripheral wall of true circle, it sometimes happens that, for example, an inner-roller having an inner-peripheral of an ellipse is actually fabricated, in a case where heat treatment is performed under a condition in which the inner-roller is lain down, due to its own weight. However, of course, the present invention includes such inner-rollers the inner-peripheral wall of which is to be true circle, but actually (or unexpectedly) have been non-true circle (for example, ellipse).

Although the fabricating method has been described by taking the inner roller as the example, it is needless to say that the present invention is also applicable to the outer roller quite similarly.

As set forth above, an inner roller (or outer roller) fabricated by a method according to the present invention has an inner-peripheral wall of mirror-finished surface, so that a lubricating oil film can be sufficiently formed even in a clearance smaller than in the prior art. Moreover, owing to the smaller clearance, an inner pin (or outer pin) can be held without giving rise to appreciable backlash. Accordingly, the formation of the lubricating oil film (in other words, the upkeep of a durability) and the relief of angular backlash can be made consistent.

Further, even when a force causing the axes of the inner pin (or outer pin) and the inner roller (or outer roller) to deviate, has been exerted by an assemblage error, an external load or the like, favorable slip characteristics can be kept up yet, and increase in the loss of power is not incurred, owing to the slight friction between both the members and the good affinity of the inner roller (or outer roller) to slide.

Moreover, as compared with the fabrication based on the "grinding" in the prior art, the method according to the present invention can drastically shorten the working period of time and can curtail the cost of a working machine itself.

What is claimed is:

1. A method of fabricating an inner roller in the shape of a cylinder, for use in an internal-meshing planetary gear construction having a first shaft, an eccentric element which is rotated by rotation of the first shaft, an external gear which is assembled so as to be rotatable eccentrically to the first shaft through the eccentric element, an internal gear with which the external gear is in internal mesh, and a second shaft which is connected to the external gear through means for transmitting only a rotational component of the external gear on an axis thereof, said inner roller being used with an inner pin in the shape of a column in order to constitute said means for transmitting only the rotational component of the external gear on the axis thereof; said method comprising the steps of:

roughly cutting a central part of a columnar inner-roller blank, to roughly form the blank into the shape of a cylinder;

chucking an outer periphery of the inner-roller blank roughly formed into the cylindrical shape, in all directions of the outer periphery by chuck means having an inner-peripheral shape correspondent to said outer periphery, so that depressive forces being substantially equal may develop at a whole circumference of said roughly formed inner-roller blank;

subjecting an inner-peripheral wall of said roughly formed inner-roller blank to a burnishing work in a state in which the depressive chucking in all the directions is done;

heat-treating the inner-roller blank subjected to the burnishing work, in a state in which said depressive chucking in all said directions is released; and subjecting an outer periphery of the heat-treated inner-roller blank to a finishing work.

2. A method of fabricating an inner roller in an internal-meshing planetary gear construction as defined in claim 1, wherein said chuck means has its inner periphery made of a material which is lower in rigidity than said inner-roller blank, and is formed so that a radius of the inner periphery thereof becomes smaller than a radius of said outer periphery of said inner-roller blank in the chucking state.

3. A method of fabricating an outer roller in the shape of a cylinder, for use in an internal-meshing planetary gear construction having a first shaft, an eccentric element which is rotated by rotation of the first shaft, an external gear which is assembled so as to be rotatable eccentrically to the first shaft through the eccentric element, an internal gear with which the external gear is in internal mesh, and a second shaft which is connected to the external gear through means for transmitting only a rotational component of the external gear on an axis thereof, said outer roller being used with an outer pin in the shape of a column in order to constitute an internal tooth of said internal gear; said method comprising the steps of:

roughly cutting a central part of a columnar outer-roller blank, to roughly form the blank into the shape of a cylinder;

chucking an outer periphery of the outer-roller blank roughly formed into the cylindrical shape, in all directions of the outer periphery by chuck means having an inner-peripheral shape correspondent to said outer periphery, so that depressive forces being substantially equal may develop at a whole circumference of said roughly formed outer-roller blank;

subjecting an inner-peripheral wall of said roughly formed outer-roller blank to a burnishing work in a state in which the depressive chucking in all the directions is done;

heat-treating the outer-roller blank subjected to the burnishing work, in a state in which said depressive chucking in all said directions is released; and subjecting an outer periphery of the heat-treated outer-roller blank to a finishing work.

4. A method of fabricating an outer roller in an internal-meshing planetary gear construction as defined in claim 3, wherein said chuck means has its inner periphery made of a material which is lower in rigidity than said outer-roller blank, and is formed so that a radius of the inner periphery thereof become smaller than a radius of said outer periphery of said outer-roller blank in the chucking state.

* * * * *